April 11, 1933.  W. R. CAMBRIDGE  1,903,440
HELICOPTER DEVICE
Filed Dec. 30, 1931  2 Sheets-Sheet 1
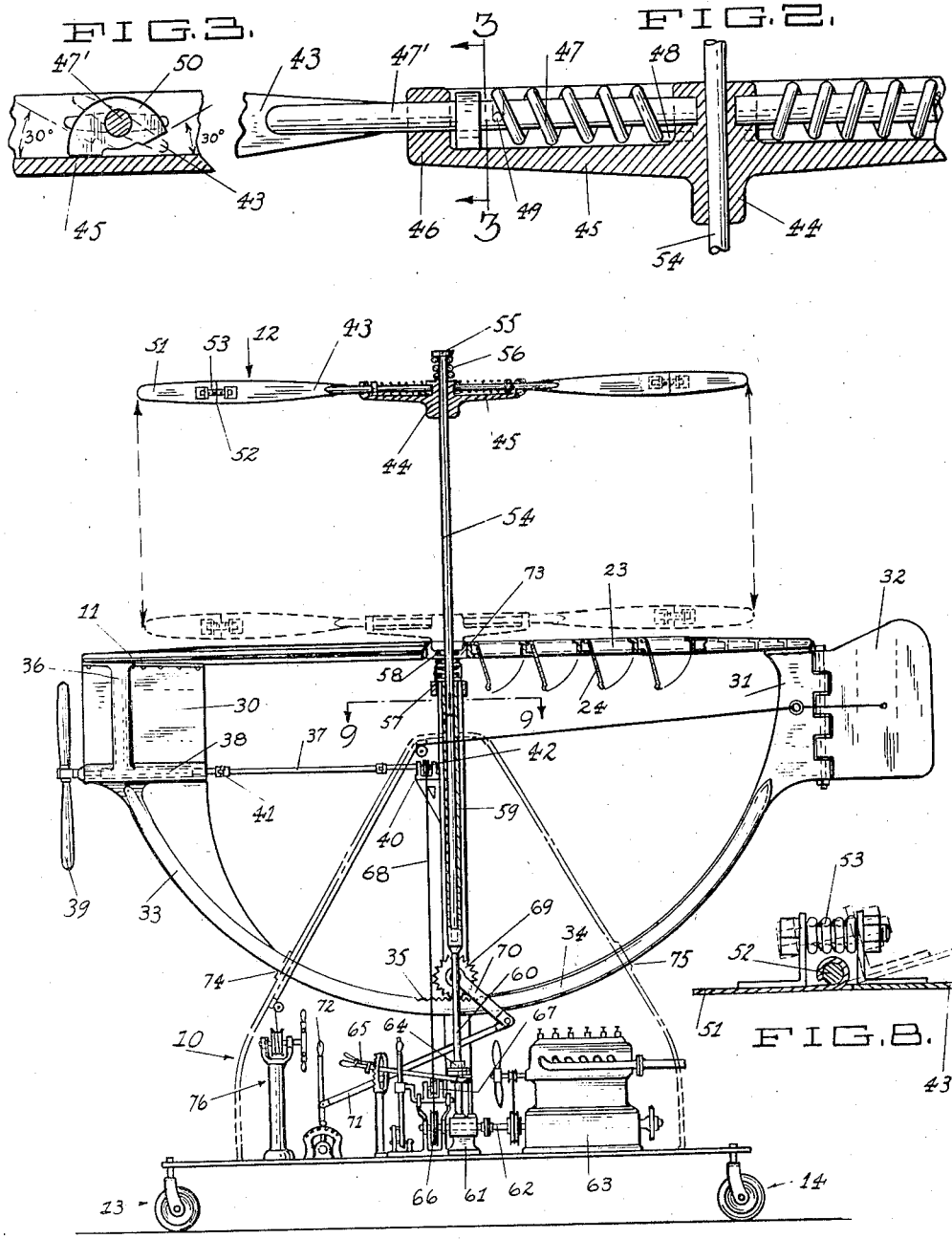
INVENTOR.
WALTER R. CAMBRIDGE
Walter R. Cambridge.

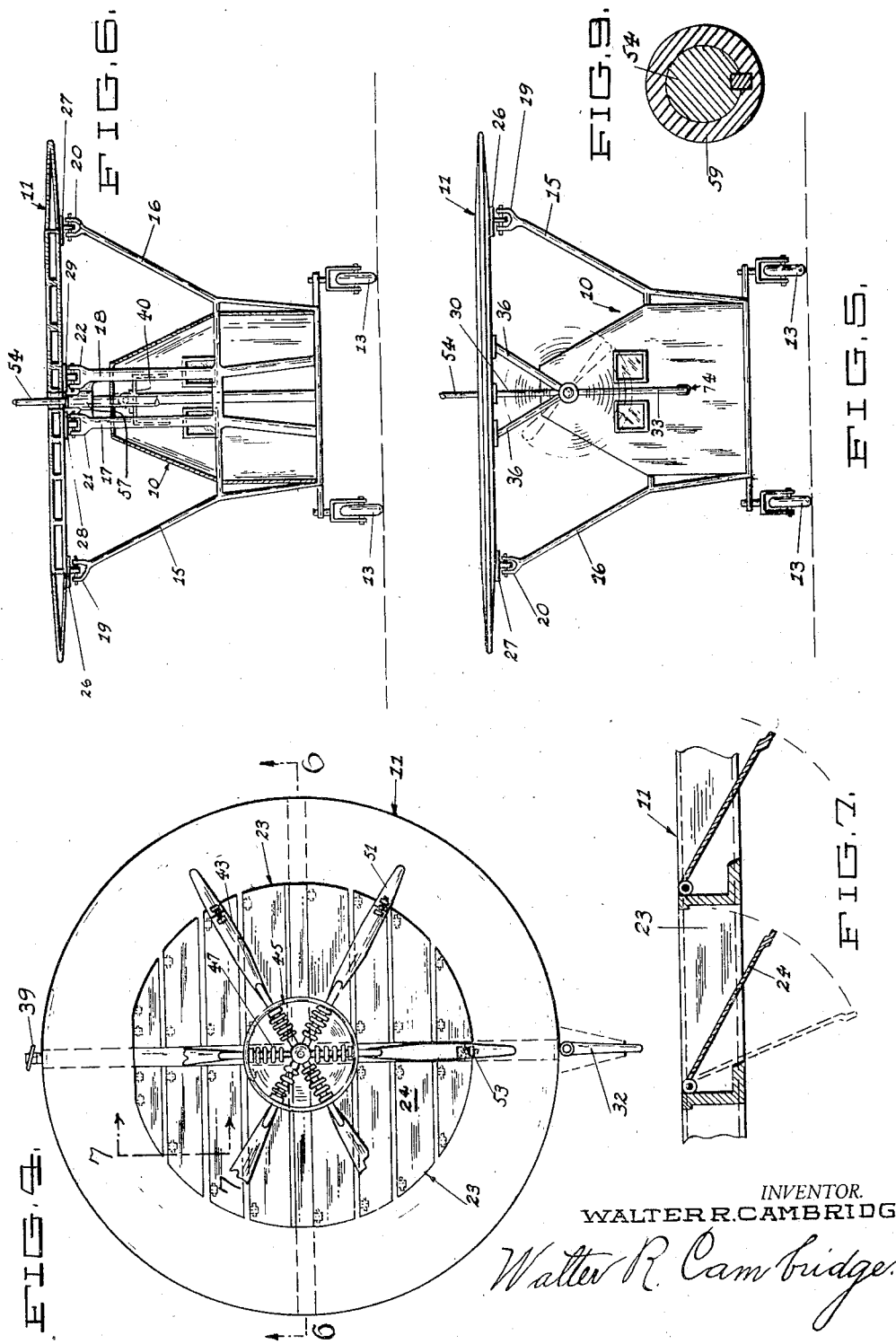

Patented Apr. 11, 1933

1,903,440

UNITED STATES PATENT OFFICE

WALTER R. CAMBRIDGE, OF FORT BIDWELL, CALIFORNIA

HELICOPTER DEVICE

Application filed December 30, 1931. Serial No. 583,882.

The present invention relates generally to improvements in flying machines and has particular reference to that class of flying machines termed helicopters.

The principal object of the invention is to provide a flying machine which embodies a main supporting airfoil for straight line flying and a helicopter propeller for causing the vertical or nearly vertical ascension of the machine in the air, the said airfoil as constructed also acting as a parachute in assisting the easy and comparatively slow descent of the machine toward the ground.

A further object of the invention is to provide a machine of the class indicated that embodies in its main supporting airfoil a plurality of hinged vanes adapted to automatically open to decrease resistance when ascending and to automatically close when in straight line flight or in descending to the ground.

A further object of the invention is to provide a machine of combined character which embodies all the features of both aeroplane and helicopter types of planes and that is accordingly exceptionally airworthy.

An additional object of the invention is the provision of a helicopter of the class indicated that employs a horizontally disposed helio propeller slidingly mounted on a vertical driving shaft in such manner that it will rise above the airfoil when in operative position and descend to a position contiguous thereto when in inoperative position.

An additional object of the invention is that of providing a helicopter propeller having a plurality of blades which normally rest in a substantially horizontal plane when in inoperative positions and when in operative positions assume angular positions or change their pitch angle from say a zero position to a position of approximately thirty degrees, said blades being additionally provided with hinged tips adapting these tips to flex upwardly relative to the main blades of the propeller.

Referring generally to the drawings:

Figure 1 is a side elevation partly in section illustrating the improved combined aeroplane and helicopter including the tiltable airfoil, the helicopter propeller, straight line flying propeller and the various controls and the driving mechanism for the helicopter propeller and the straight line flying propeller;

Figure 2 is an enlarged fragmentary section of the hub mechanism of the helicopter propeller showing the method of mounting the blades therein and the spring means for normally holding the blades in horizontal or nearly horizontal positions;

Figure 3 is an enlarged sectional detail of the means for limiting the angular movement of the propeller blades, the section being indicated by the section line 3—3 in Figure 2;

Figure 4 is a top plan view of the machine illustrating the configuration of the airfoil and showing the hinged vanes therein and a portion of the helicopeter propeller;

Figure 5 is a front elevation of the entire machine showing the method of mounting the tiltable airfoil of the body of the device also the supporting wheels and frame;

Figure 6 is a transverse section of the machine as indicated by the section line 6—6 in Figure 4, the helicopter propeller being omitted;

Figure 7 is an enlarged sectional detail illustrating the method of hingedly mounting the swingable vanes of the airfoil, the section being indicated by the section line 7—7 in Figure 4;

Figure 8 is a sectional detail illustrating the method of hinging the tips of the helicopter blades so that they may flex relative to the remaining portions of the blades; and Figure 9 is an enlarged cross sectional view taken through the helicopter propeller driving shaft showing the method of splining the shaft to the driving sleeve.

Referring now more particularly to the drawings in which the preferred form of the invention is illustrated the improved helicopter device consists generally of a suitable body 10, tiltable airfoil 11 and helicopter propeller 12.

The body 10 is provided with suitable front and rear pairs of wheels 13 and 14, respectively, and the upper section of the body is provided with tubular upstanding braces 15, 16, 17 and 18 terminating in suitable hinge members 19, 20, 21 and 22, as clearly disclosed in Figures 5 and 6.

The airfoil 11 consists of a circular member or wing having a concentric opening 23 formed therein, as indicated in Figures 1 and 4, said opening being provided with a plurality of hinged vanes 24, as indicated in Figures 1 and 7, said airfoil being hingedly connected to the hinge members 19, 20, 21 and 22 of the body by means of hinge elements 26, 27, 28 and 29.

The airfoil 11 is additionally provided with a fixed vertical stabilizing rudder of fin 30 at its forward end and a fixed fin 31 at its rear end and is also provided with a steering rudder 32, all clearly disclosed in Figures 1 and 4. Said airfoil being also provided with a rigid tubular frame 33 which frame is vertically arranged below the airfoil, as disclosed in Figures 1 and 5, said frame being semi-circular in configuration and having its lower arcuate section 34 extending through the body 10 and provided at this point with rack teeth 35, said arcuate frame conforming to the hinge point of the airfoil, as hereinafter more fully set forth.

The frame 33 includes forward braces 36 and the propeller shaft 37 is mounted in a bearing sleeve 38 preferably formed integral therewith, said propeller shaft being provided at its outer end with an aeroplane propeller 39, as indicated in Figures 1, 4 and 5. The inner end of said shaft being supported in a bearing member 40 and having universal joints 41 therein to allow said shaft to accommodate itself to slight changes in angle due to the tilting of the airfoil, said shaft being also provided at its inner end with a small pulley 42, Figure 1.

The helicopter propeller 12 consists of a lifting propeller and embodies a plurality of blades 43 carried by a slidable hub 44 which hub is provided with an annularly arranged spider 45 including bearing bosses 46 through which the shanks 47' of the propeller blades extend the inner ends of said shanks being rotatably mounted in the central hub 44, as clearly disclosed in Figures 2 and 4.

Torsion springs 47 surround the propeller shafts and these springs are fastened at their inner ends 48 to the hub 44 and at their outer ends 49 to the shanks 47. Stop means 50 consisting of a segment, as disclosed in Figure 3, limits the movement of the propeller blades to a thirty degree angle relative to their neutral positions, which is their normal position when not in operation due to the action of the torsion springs 47, the said blades taking their angle of incidence against the torsion exerted by the springs 47 due to air pressure when actuated as in ascending.

The outer ends or tips 51 of the blades 43 are hinged to the blades by means of hinges 52, Figures 1 and 8, said tips being held in normal positions by means of spring members 53 so that they may flex upwardly when the propeller has gained considerable velocity for the purpose hereinafter more fully set forth.

A shaft 54 extends vertically through the body 10 of the machine and is provided at its upper end with a head 55 and a compression spring 56 and at a position slightly below the airfoil with a collar 57 and a compression spring 58, said collar being mounted on the sleeve 59 in which the shaft 54 is splined, as indicated in Figure 9.

The shaft 60 is provided at its lower end with a worm drive reduction gear housing 61 the gears being driven by the shaft 62 of the power unit 63. A clutch 64 causes the shaft 59 to be driven when desired or it may be disconnected from the driving shaft by means of a clutch lever 65, as disclosed in Figure 1.

The shaft 54 telescopes into the sleeve 59 and when the helicopter propeller 12 is in operative position, as shown in Figure 1, said shaft is drawn upwardly in the sleeve and when the propeller is in the inoperative position, as indicated in dot-and-dash lines, the shaft is completely telescoped within the sleeve.

The driving shaft 62 is provided with a pulley 66 and a belt tightener mechanism 67 and said pulleys 42 and 66 are of the V-type and adapted to receive a V-belt 68, as indicated in dotted lines in Figure 1.

The means for causing the tilting of the airfoil 11 relative to the body 10 of the machine consists of the rack gear 69 mounted in the housing in position to mesh with the segmental rack section 35, which section is constantly in mesh with the teeth of the rack gear, said gear 69 being actuated by means of a lever arm 70, link 71 and actuating lever 72.

It will be observed with reference to Figures 1 and 4 that the central section of the airfoil 11 is provided with an opening 73 and that the pivotal point of the airfoil is slightly below the under face thereof, as disclosed in Figures 5 and 6.

The shaft 54 operates through the opening 73 so that the airfoil may be canted relative to said shaft by virtue of said slot without interfering in any way with the operation of the shaft. It will also be noted with reference to Figure 1 that the housing is provided with slots 74 and 75 which slots allow for the action of the frame 33 relative to the housing when the airfoil is tilted.

The fixed fins 30 and 31 prevent side or lateral drift of the machine when in the air and also tend to prevent turning of the body thereof when the machine is in vertical or nearly vertical flight, and the rudder 32 controllable by the pilot through the steering mechanism 76 gives the machine the proper and desired steerageway in straight line flight.

In recapitulation:

When it is desired to ascend vertically with the machine the motor 63 is started and the clutch 64 is then manipulated which causes the rotation of shaft 54 and sleeve 59 and the helicopter propeller 12, the rotating action of said propeller when sufficient velocity is attained causing the machine to be lifted vertically or nearly vertically from the ground.

It will be observed in this connection that the propeller 12 when in inoperative position rests upon the compression spring 58, but immediately elevates itself and the shaft 54 as it gains momentum so that when at full speed it remains at the upper end of the shaft and against the buffer spring 56.

The hinged vanes 24 act in unison and are dropped to the position shown in Figure 1 when the plane is ascending thus tending to greatly reduce the area thereof and of the airfoil and consequently reduce the resistance thereof, but when the plane is in straight line flight or descending to the earth said vanes automatically close and cause the airfoil to act as a supporting parachute.

When sufficient altitude has been gained the belt tightener 67 is actuated and the straight line propeller 39 is driven from the engine shaft by means of the V-belt 68 and as the machine gains sufficient momentum in straight line flight the clutch 64 is manipulated to reduce the speed of the helicopter propeller 11 so that the resistance of said propeller is reduced to a minimum during straight line flying.

The airfoil 11 being hinged at its diametrical center is tiltable by means of the gear 69 and the lever 72, as hereinbefore described, the required angle being determined by the pilot to suit requirements of straight line flight.

It is obvious from the foregoing description that the helicopter blades, due to their arrangement in the spider 45, will gradually change their angle from horizontal positions to a thirty degree angle as the propeller gains momentum and when it attains its highest velocity these blades will all assume their maximum angular positions, which greatly increases the lifting power of said propeller.

I claim and desire to secure by Letters Patent of the United States the following:

1. In a helicopter device of the class described, a body section, a shaft extending from said body section, a helicopter propeller slidably mounted on said shaft and embodying a splined hub having a plurality of blades radiating therefrom, means for normally holding said blades in flat positions, means for causing the same to change their pitch angle when in operation, including elements in the form of springs surrounding the shanks of the blades and cooperating therewith to cause the blades to normally lie flat when in inoperative positions and to assume a pitch angle of substantially thirty degrees when in operative positions.

2. In a helicopter device of the class described, in combination, a body section, a tiltable airfoil hingedly mounted above the body section, a power unit in said body section, said airfoil comprising a circular member embodying a plurality of hinged vanes adapted to open downwardly, means for limiting the swinging movements of said vanes, a shaft extending upwardly through the body and operatively connected to said power unit, a helicopter propeller mounted on said shaft and normally adapted to lie above said airfoil, said helicopter propeller when rotated tending to climb upwardly on said shaft and assume an operative position considerably above said airfoil, and buffer means mounted on said shaft and adapted to absorb the shocks attendant to the vertical movements of said propeller on said shaft.

3. In a helicopter device of the class described, a body section, a vertically disposed driving shaft, a helicopter propeller slidably mounted on said driving shaft, said propeller embodying a hub and an annular blade supporting frame, radial blades extending from said frame and having their shanks extending through the frame, springs mounted on said shanks and tending to normally urge said blades to horizontal inoperative positions, and means whereby the rotation of said propeller causes the blades to assume an operative pitch angle against the urge of said springs.

4. In a helicopter device of the class described as claimed in claim 3 and including means associated with said shanks for limiting their angular movements.

In testimony whereof I hereunto affix my signature.

WALTER R. CAMBRIDGE.